(12) United States Patent
Nagaoka (10) Patent No.: US 8,249,373 B2
(45) Date of Patent: Aug. 21, 2012

(54) IMAGE DATA DECODING APPARATUS AND METHOD FOR DECODING IMAGE DATA

(75) Inventor: Hirofumi Nagaoka, Kawasaki (JP)

(73) Assignee: Fujistu Limited, Kawasaki (JP)

( * ) Notice: Subject to any disclaimer, the term of this patent is extended or adjusted under 35 U.S.C. 154(b) by 725 days.

(21) Appl. No.: 12/412,060

(22) Filed: Mar. 26, 2009

(65) Prior Publication Data

US 2009/0245663 A1    Oct. 1, 2009

(30) Foreign Application Priority Data

Mar. 28, 2008   (JP) ................................. 2008-087590

(51) Int. Cl.
   *G06K 9/36*    (2006.01)
   *G06K 9/46*    (2006.01)
   *H04B 1/66*    (2006.01)
(52) U.S. Cl. .................... 382/238; 375/240.12; 382/250
(58) Field of Classification Search .................... None
   See application file for complete search history.

(56) References Cited

U.S. PATENT DOCUMENTS

| 7,257,262 B2 | 8/2007 | Takahiro et al. | |
| 7,764,738 B2 * | 7/2010 | Kim et al. | 375/240.12 |
| 2002/0006162 A1 * | 1/2002 | Nakao et al. | 375/240.16 |
| 2004/0240558 A1 * | 12/2004 | Hatano et al. | 375/240.24 |
| 2006/0146940 A1 * | 7/2006 | Gomila et al. | 375/240.27 |
| 2007/0003149 A1 * | 1/2007 | Nagumo et al. | 382/233 |
| 2007/0121731 A1 * | 5/2007 | Tanizawa et al. | 375/240.24 |
| 2009/0175334 A1 * | 7/2009 | Ye et al. | 375/240.12 |

FOREIGN PATENT DOCUMENTS

| JP | 2004-266731 | | 9/2004 |
| JP | 2005-318559 | A | 11/2005 |

OTHER PUBLICATIONS

Japanese Office Action mailed on Jan. 10, 2012 for corresponding Japanese Application No. 2008-087590, with Partial English-language Translation.

* cited by examiner

*Primary Examiner* — Li Liu
(74) *Attorney, Agent, or Firm* — Fujitsu Patent Center

(57) ABSTRACT

An image decoding apparatus includes a memory, a detecting part which receives data of a plurality of macroblocks included in an image and detects whether or not a first macroblock included in the plurality of macroblocks has an intra-block, and a control part which writes a DCT coefficient of the first macroblock into the memory when the detecting part determines that the first macroblock has the intra-block, and does not write the DCT coefficient of the first macroblock into the memory when the detecting part determines that the first macroblock has no intra-block.

8 Claims, 10 Drawing Sheets

IMAGE DATA DECODING APPARATUS AND METHOD FOR DECODING IMAGE DATA

CROSS-REFERENCE TO RELATED APPLICATIONS

This application is based upon and claims the benefit of priority from the prior Japanese Patent Application No. 2008-87590, filed on Mar. 28, 2008, the entire content of which is incorporated herein by reference.

FIELD

The embodiment discussed herein is related to a decoding apparatus for moving images and a method for decoding image data.

DESCRIPTION OF THE RELATED ART

Moving images are delivered using digital data, such as digital broadcasting and network broadcasting. Further, moving images are encoded at a high compression rate, whereby moving image information with high resolution is transferred.

In the technique of encoding moving images, inter-frame prediction using a relation between adjacent images and intra-frame prediction using a relation between adjacent pixels are used. The intra-frame prediction includes a method of predicting a pixel value as is and a method of predicting a direct-current (DC) component of a discrete cosine transform (DCT) coefficient orthogonally transformed by using DCT and an alternating-current (AC) component. In the latter method, the prediction is performed using values of the DC components and the AC components of a block located on the upper side of a prediction target block, a block located on the upper left side of the prediction target block, and a block located on the left side of the prediction target block.

Figure 6:
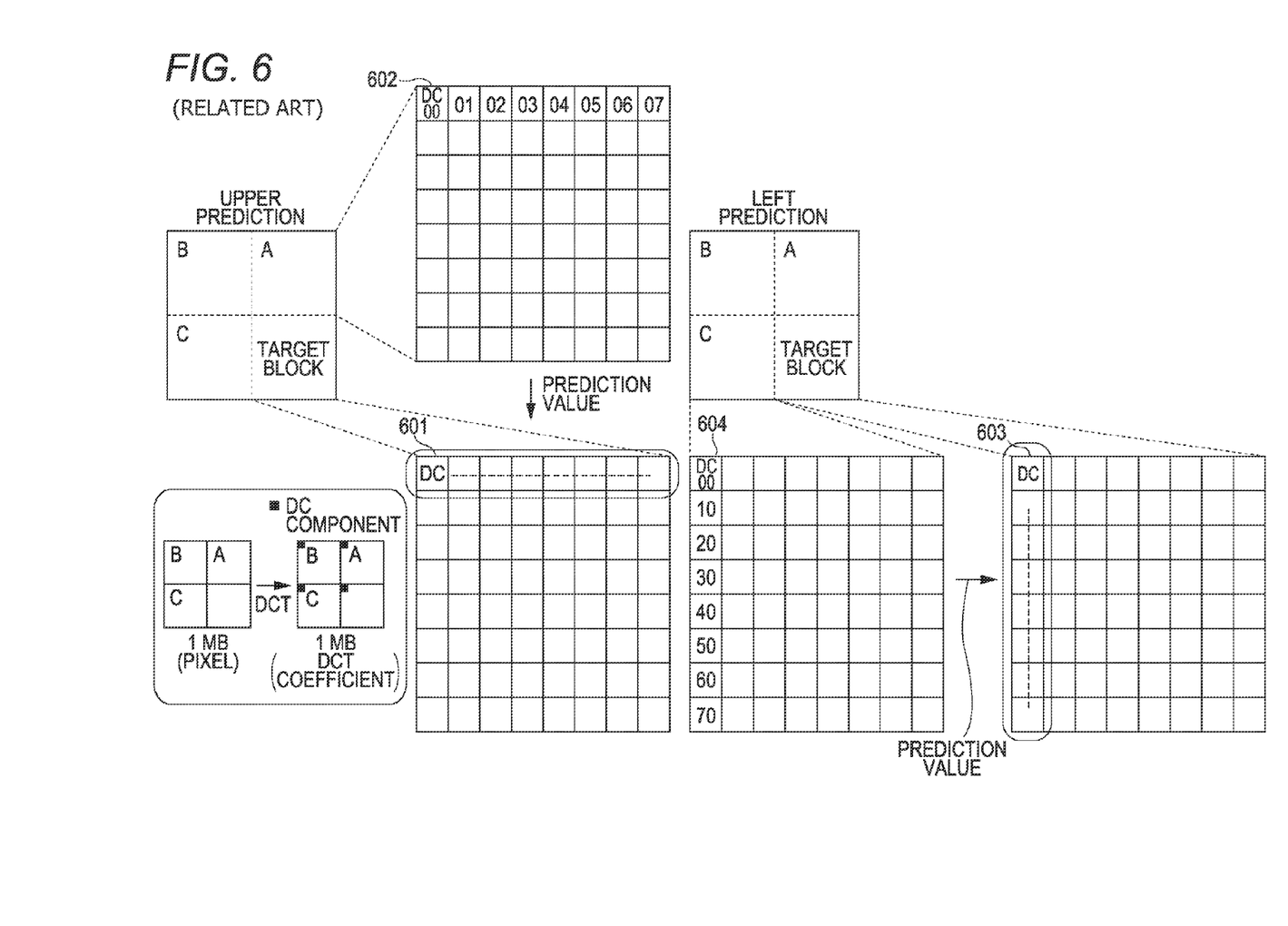
FIG. 6 is a conceptual diagram of an upper prediction and a left prediction.

When encoded data using prediction decoding is decoded, for example in the calculation of a DC coefficient 601 of a target block in upper prediction shown in FIG. 6, a DC coefficient 602 of a block A located on the upper side of the target block is used as a prediction value, and the prediction value and a difference value are added to each other; thus, the DC coefficient 601 of the target block is calculated. The same calculation holds for an AC coefficient. To calculate the DC coefficient and the AC coefficient of the target block, the DC coefficient and the AC coefficient of a block located on the upper side of the target block are used. Therefore, the DC coefficient and the AC coefficient of a block located on the upper side of the target block are stored in a memory.

In left prediction shown in FIG. 6, when a DC coefficient 603 of the target block is calculated, a DC coefficient 604 of a block C located on the left side of the target block is used as the prediction value, and the prediction value and a difference value are added to each other; thus, the DC coefficient of the target block is calculated.

Whether the coefficient of the block located on the upper side of the target block or the coefficient of the block located on the left side thereof is used is determined based on the DC coefficient and the AC coefficient of a block B located on the upper left side of the target block.

The DC coefficient and the AC coefficient in the currently processed block are used for the prediction of a block located around the currently processed block. Thus, when intra-frame coded compression data is decoded using the DC coefficient and the AC coefficient, the DC coefficient and the AC coefficient of the currently processed block are stored in a memory.

In the conventional decoding apparatus, even when a coefficient of a current macroblock (hereinafter also referred to as "MB") is not used in the decoding of a macroblock adjacent on the lower side of the current macroblock, the coefficient of the current macroblock as a prediction value is written in a memory. Therefore, there arises a problem such as a shortage of a bandwidth of the memory. In the encoding method described in Japanese Patent Laid-Open Publication No. 2004-266731, a capacity of a reference image memory is reduced while maintaining suitable encoding efficiency and image quality, depending on the intended use.

SUMMARY

According to an aspect of the invention, an image decoding apparatus includes a memory, a detecting part which receives data of a plurality of macroblocks included in an image and detects whether or not a first macroblock included in the plurality of macroblocks has an intra-block, and a control part which writes a DCT coefficient of the first macroblock into the memory when the detecting part determines that the first macroblock has an intra-block, and does not write the DCT coefficient of the first macroblock into the memory when the detecting part determines that the first macroblock has no intra-block.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Figure 7:
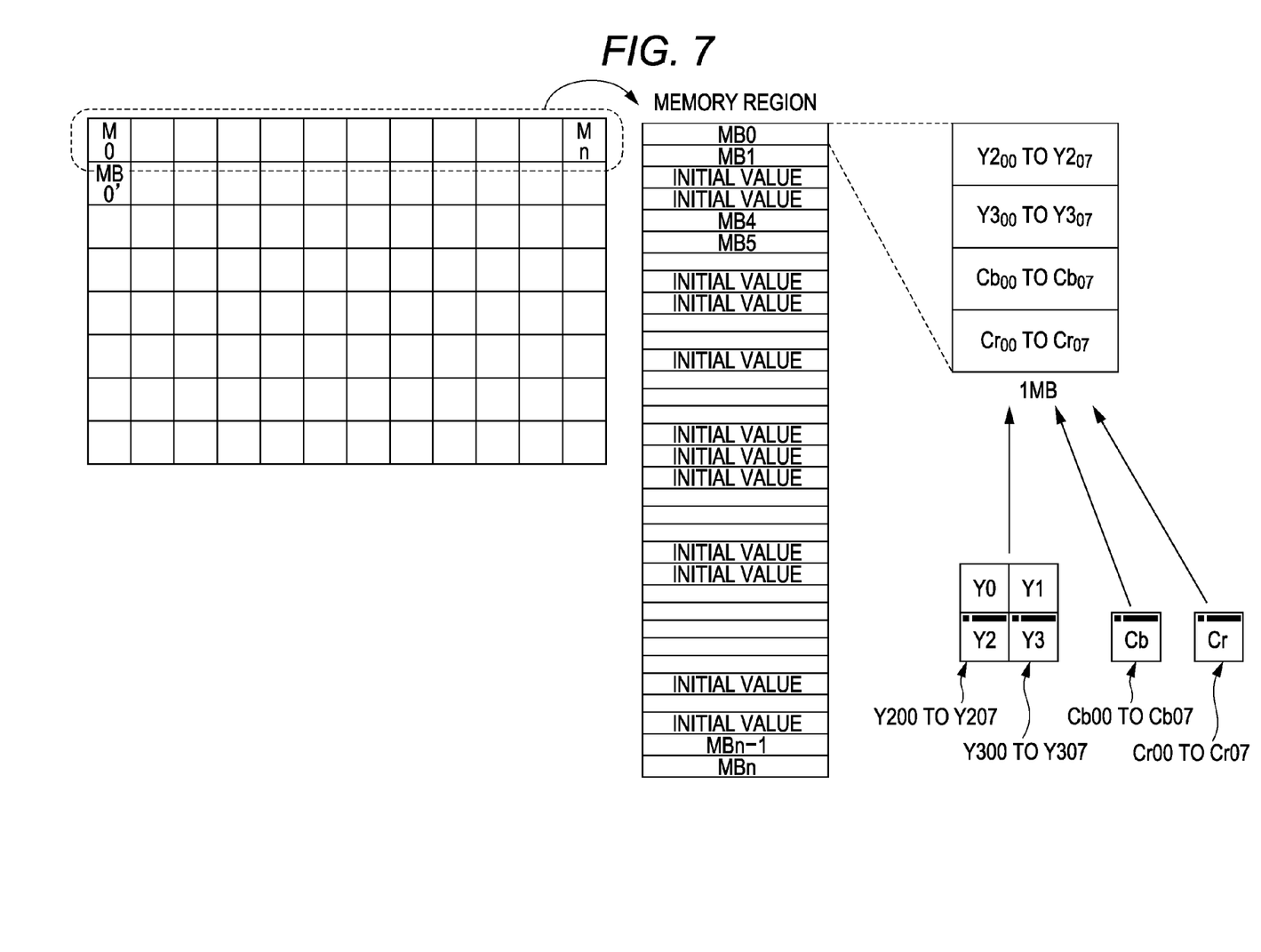
FIG. 7 is a storage example of data in a memory region according to a reference technique.

FIG. 7 is a storage example of data in a memory considered by the present inventor before the present invention was created. This storage example is described as a reference technique in the present specification. Among macroblocks spread in an array form, one macroblock line (hereinafter also referred to as MB line) of a memory region in which the macroblocks are arranged on one line in the lateral direction is provided in an external memory, and an intra-frame prediction decode processing is performed using a DC coefficient and an AC coefficient stored in the memory region.

For example, data of brightness and color difference of MB0 is stored in an MB0 memory region. In the process of decoding, motion compensation is performed in units of a macroblock. The macroblock includes brightness Y, and color differences Cb and Cr.

When the macroblock has 16 pixels in the longitudinal direction and 16 pixels in the lateral direction (hereinafter described as 16×16 pixels), and when a processing unit of DCT is 8×8 pixels, the brightness Y has 4 blocks of 8×8 pixels. Since the color differences Cb and Cr are sub-sampled at 2:1 in the horizontal and vertical directions to the brightness Y, the color differences Cb and Cr have one block of 8×8 pixels.

Thus, the data of 16×16 pixels is calculated from the macroblock made up of the above 6 blocks. The brightness block shown in FIG. 7 is made up of 4 blocks Y0, Y1, Y2, and Y3, and these blocks are respectively located on the upper left side, the upper right side, the lower left side, and the lower right side.

For example, coefficients Y200 to Y207 and Y300 to Y307 on the top line of the brightness blocks Y2 and Y3 and coefficients Cb00 to Cb07 and Cr00 to Cr07 on the top line of the color difference blocks Cb and Cr are stored in the MB0 memory region.

The data stored in the MB0 memory region is used as the prediction value when the DCT coefficient of MB0' located under MB0 is calculated in the process of decoding.

Figure 8:
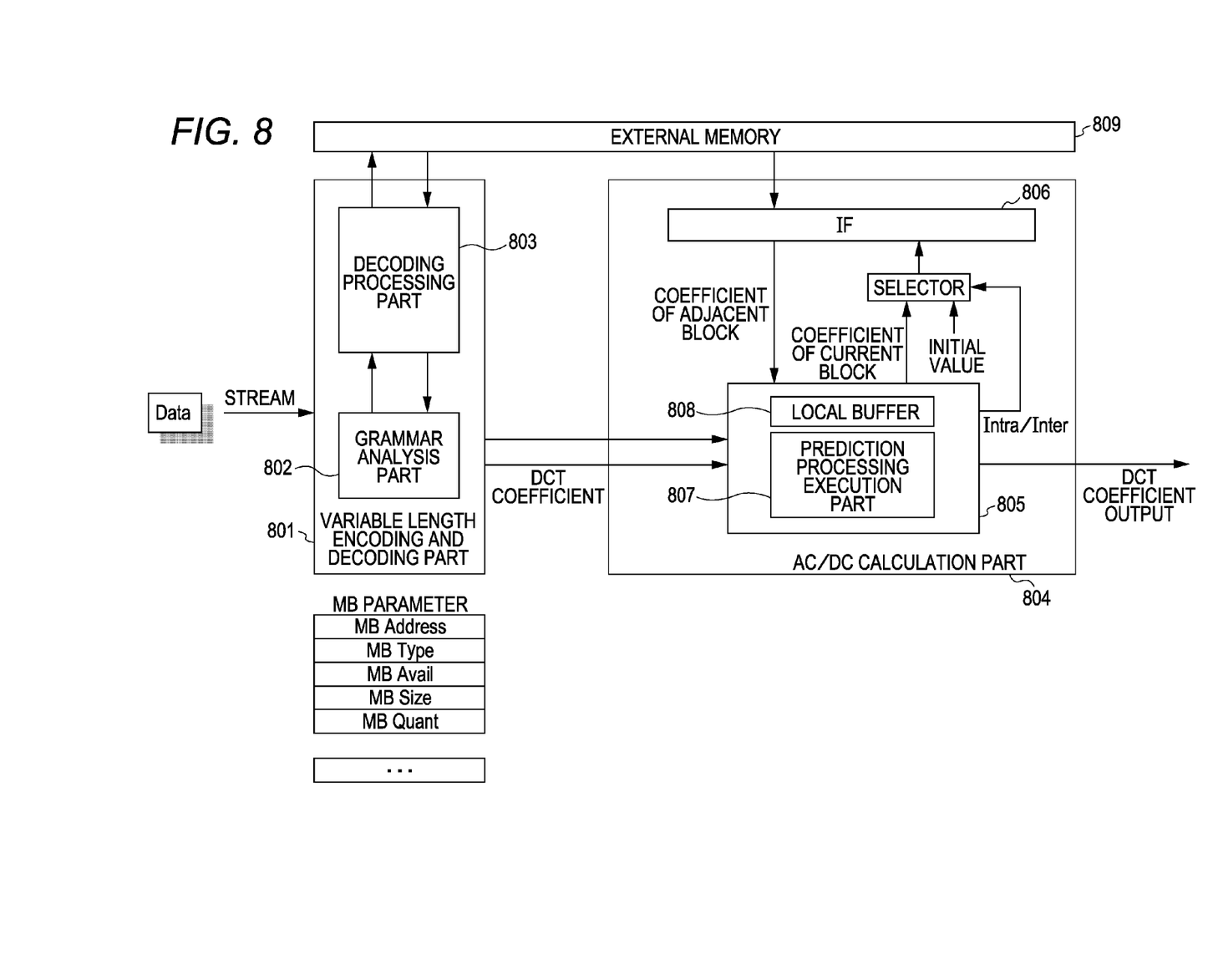
FIG. 8 is a configuration diagram of an AC/DC calculation part and a variable length encoding and decoding part according to a reference technique.

FIG. 8 is a configuration diagram of an AC/DC calculation part and a VLC decoding part.

A variable length code (VLC) decoding part 801 is provided with a grammar analysis part 802 and a decoding processing part 803. An AC/DC calculation part 804 is provided with a processing part 805 and an IF 806. The processing part 805 is provided with a prediction processing execution part 807 and a local buffer 808.

The data to be input (also called a bit stream) is data encoded by orthogonal conversion using the discrete cosine transform and by prediction encoding using a difference between adjacent blocks or adjacent frames. For example, such data may include MPEG-4 data and VC-1 data.

The grammar analysis part 802 analyzes input data and outputs the analyzed data to the decoding processing part 803. The decoding processing part 803 decodes the data based on the analysis result from the grammar analysis part 802 and outputs a parameter of the macroblock and the DCT coefficient to the AC/DC calculation part 804. The DCT coefficient before the prediction processing output from the VLC decoding part 801 is an original difference value of the DCT coefficient.

The prediction processing execution part 807 reads the prediction value used in the decoding from the external memory 809 to the local buffer 808 through the IF 806. The prediction processing execution part 807 then reads the prediction value from the local buffer 808 and adds the prediction value to the difference value to calculate the DCT coefficient. The DCT coefficient includes the DC coefficient and the AC coefficient.

Figure 9:
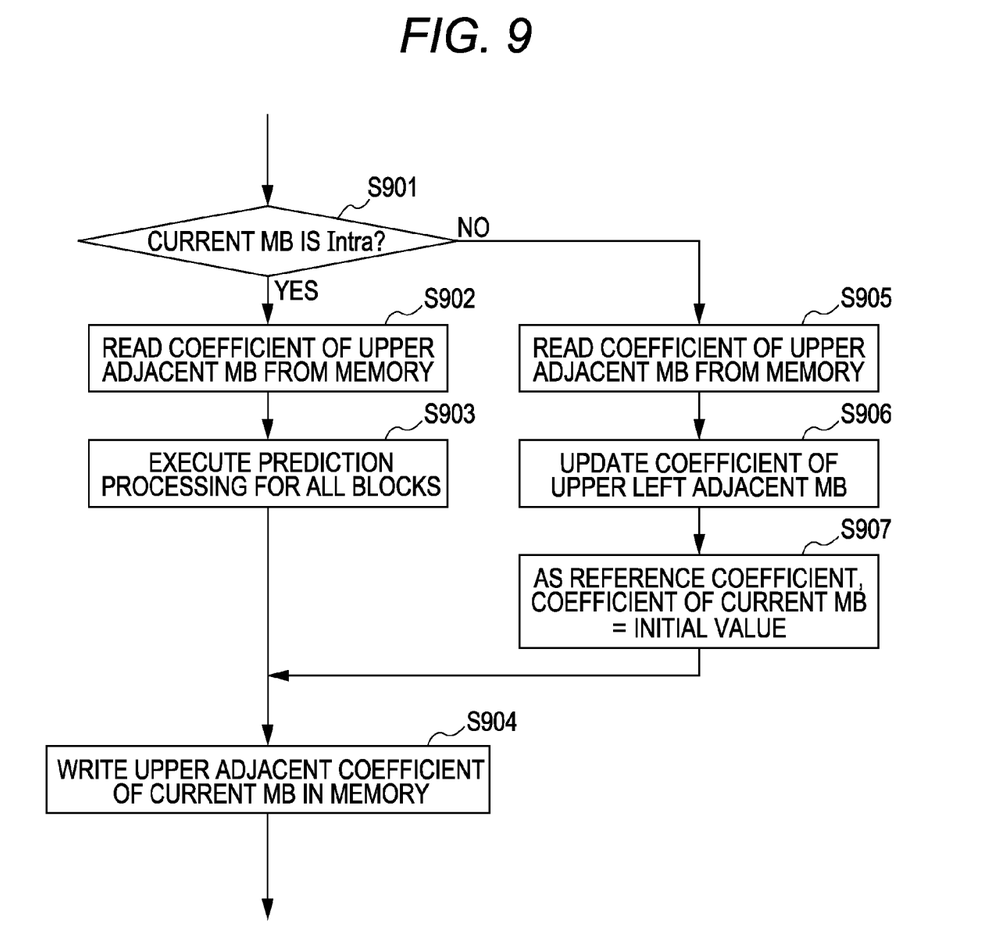
FIG. 9 is a flow chart of an intra-frame prediction processing of 1 macroblock according to a reference technique.

The AC/DC calculation part 804 outputs the calculated DCT coefficient after the prediction processing. FIG. 9 is a flow chart of an intra-frame prediction processing for one macroblock in a reference technique. Whether or not the currently processed macroblock is an intra macroblock is judged (S901). The intra macroblock is a block made up of the macroblock and includes one or more intra blocks. Meanwhile, the macroblock in which the intra block is not included in the block made up of the macroblock is called an inter macroblock or a non-intra macroblock. The intra block is a block encoded by intra-frame encoding. A block encoded by inter-frame encoding is called an inter block.

When the currently processed macroblock is an intra macroblock, the coefficient of the macroblock adjacent to the upper side of the currently processed macroblock (hereinafter referred to as an upper adjacent MB) is read from the external memory 809 (S902). The prediction processing of coefficients of all blocks of the currently processed macroblock is executed based on the read coefficient (S903). The coefficient of the currently processed macroblock calculated by the prediction processing is written in a region of the external memory 809 in which the coefficient of the upper adjacent MB is stored (S904).

When the currently processed macroblock is not an intra macroblock, the coefficient of the upper adjacent MB is read from the external memory 809 (S905), and the coefficient of the macroblock (an upper left adjacent MB) located on the upper left side of the currently processed macroblock is updated (S906). As a reference coefficient, the coefficient of the currently processed macroblock is chosen as an initial value (S907), and the coefficient of the currently processed macroblock is written in the region of the external memory 809 in which the coefficient of the upper adjacent MB is stored (S904).

Figure 10:
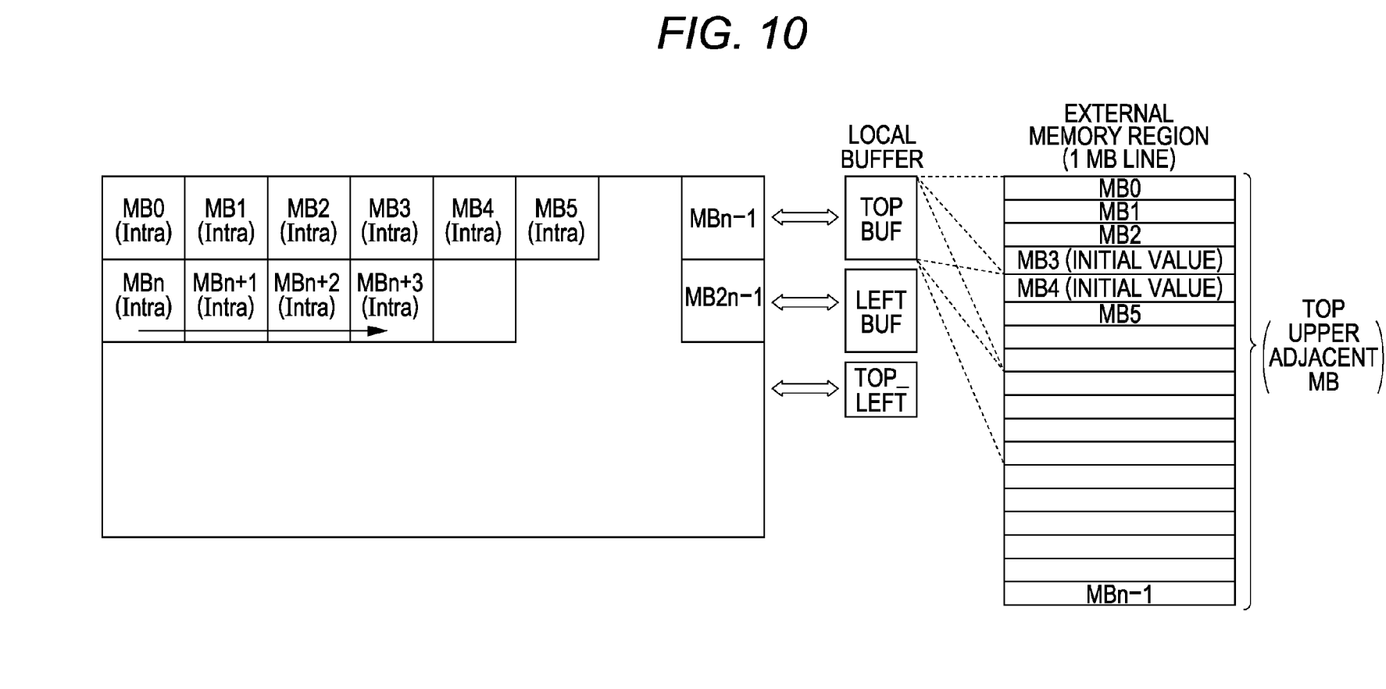
FIG. 10 is a conceptual diagram of a memory in a DC/AC prediction decode processing according to a reference technique.

FIG. 10 shows a configuration example of an MB line in a DC/AC prediction decode processing. In the AC/DC calculation processing of the MB line located in the second row, the AC/DC calculation processing is performed while reading the coefficient of the upper adjacent MB. When the macroblock is not an intra macroblock, the initial value is written. The transfer between the local buffer 808 and the external memory 809 can be performed in units of one or a plurality of macroblocks. All 1 MB line of AC coefficients and DC coefficients are stored in the external memory 809 as upper adjacent coefficients.

Figure 1:
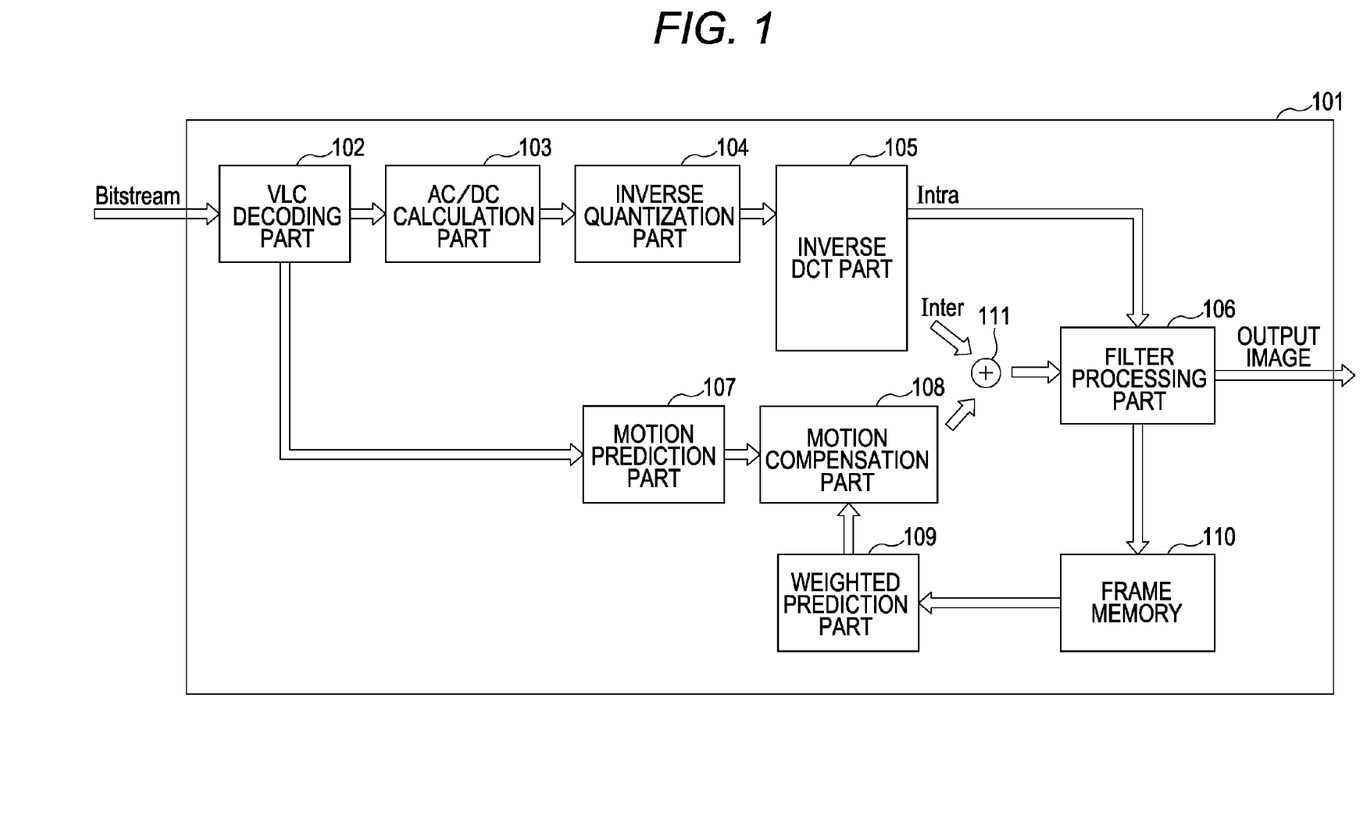
FIG. 1 is a configuration diagram of a decoding apparatus according to an embodiment of the invention.

FIG. 1 is a configuration diagram of a decoding apparatus according to an embodiment of the invention.

A decoding apparatus 101 has a variable length code (VLC) decoding part 102, an AC/DC calculation part 103, an inverse quantization part 104, an inverse DCT part 105, a filter processing part 106, a motion prediction part 107, a motion compensation part 108, a weighted prediction part 109, a frame memory 110, and an adder part 111.

The decoding apparatus 101 is used for decoding moving image data such as MPEG-4 and VC-1. When data is input to the decoding apparatus 101, the VLC decoding part 102 decodes data, which is variable length code data, and outputs the decoded data to the AC/DC calculation part 103 and the motion prediction part 107.

The bit stream which is data to be input is data encoded by using the orthogonal conversion using the discrete cosine transform and prediction encoding using a difference between adjacent blocks or adjacent frames.

The AC/DC calculation part 103 calculates the DC coefficient and the AC coefficient of the input data and outputs these coefficients to the inverse quantization part 104.

The inverse quantization part 104 inversely quantizes the DC coefficient and the AC coefficient and outputs these coefficients to the inverse DCT part 105.

The inverse DCT part 105 performs inverse discrete cosine transform. When the processed block is the intra-block, the inverse DCT part 105 outputs the conversion result to the filter processing part 106, and when the processed block is the inter-block, the inverse DCT part 105 outputs the conversion result to the adder part 111.

The filter processing part 106 performs filter processing such as removal of noise appearing in a boundary of the macroblock and outputs a decoded frame to the outside and the frame memory 110.

The motion prediction part 107 performs motion prediction to output the result of the motion prediction to the motion compensation part 108.

The motion compensation part 108 performs motion compensation based on prediction data from the motion prediction part 107 and a weight calculated by the weighted prediction part 109 to output the result of the motion compensation to the adder part 111.

The decoded frame is stored in the frame memory 110. The adder part 111 adds an output of the inverse DCT part 105 to an output of the motion compensation part 108 to output the outputs to the filter processing part 106.

Figure 2A:
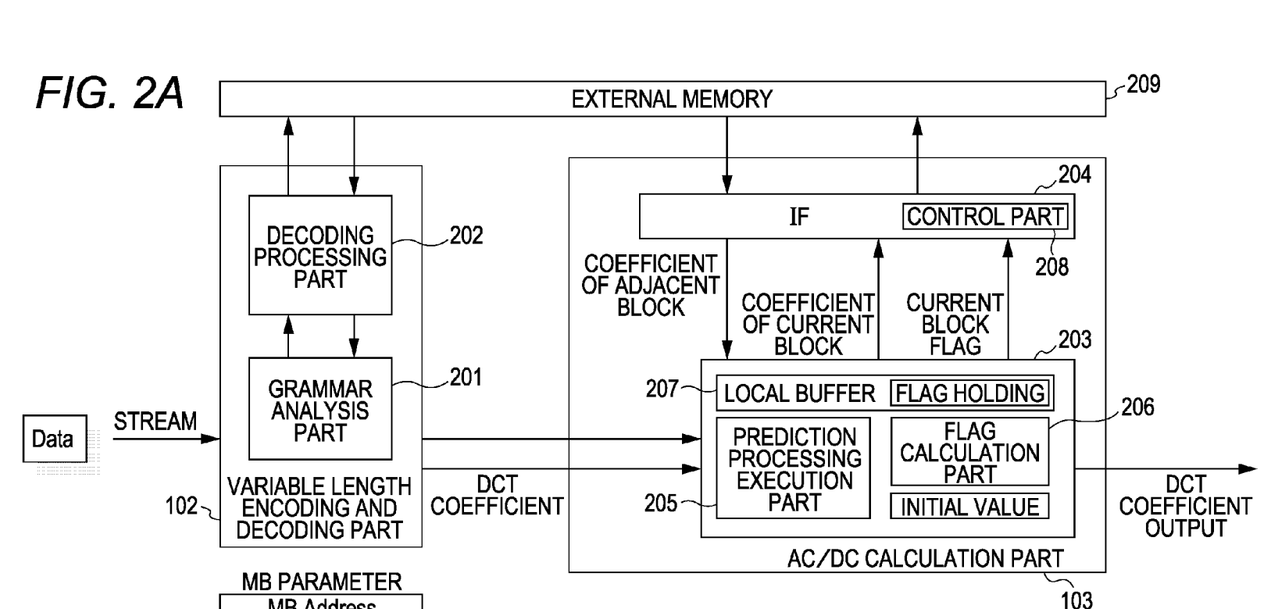
FIGS. 2A and 2B are configuration diagrams of an AC/DC calculation part and a variable length encoding and decoding part according to an embodiment of the invention.

FIG. 2A is a configuration diagram of the AC/DC calculation part and the VLC decoding part according to the embodiment of the invention.

The VLC decoding part 102 has a grammar analysis part 201 and a decoding processing part 202. The AC/DC calculation part 103 has a processing part 203 and a memory interface IF 204. The processing part 203 has a prediction processing execution part 205, a flag calculation part 206, and a local buffer 207.

The IF 204 is provided with a control part 208 for controlling connection to an external memory 209. The grammar analysis part 201 analyzes the input data to output the data to the decoding processing part 202.

The decoding processing part 202 decodes data based on the analysis result from the grammar analysis part 201 and outputs a parameter of the macroblock (hereinafter referred to as an MB parameter) and the DCT coefficient to the AC/DC calculation part 103. The DCT coefficient before the prediction processing to be output from the VLC decoding part 102 is an original difference value of the DCT coefficient.

The MB parameter includes an MB Address showing a position of the macroblock in a screen, an MB Type showing whether the macroblock includes the intra-block, an MB Avail showing the direction where other macroblock adjacent to the macroblock exists on a screen, an MB Size showing the size of the macroblock, and an MB Quant showing the degree of quantization of the macroblock.

The prediction processing execution part 205 reads the prediction value used in the decoding from the external memory 209 to the local buffer 207 through the IF 204. The prediction processing execution part 205 then reads the prediction value from the local buffer 207 and adds the prediction value to the difference value to calculate the DCT coefficient. When the prediction value does not exist in the external memory 209, the prediction value is not read from the external memory 209, but the prediction value becomes a specific initial value. The DCT coefficient includes the DC coefficient and the AC coefficient.

The flag calculation part 206 judges whether the currently processed macroblock is the intra macroblock or the inter macroblock on the basis of the MB parameter output from the VLC decoding part 102 and stores the flag, corresponding to the judgment, in the local buffer 207. In the present embodiment, when the currently processed macroblock is an intra macroblock, the flag is 1, and when the currently processed macroblock is an inter macroblock, the flag is 0.

The control part 208 does not access the external memory 209 when the flag of the upper adjacent macroblock is 0 or when the flag of the currently processed macroblock is 0.

Figure 2B:
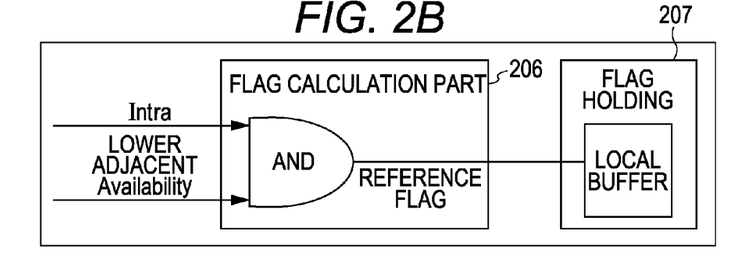

The AC/DC calculation part 103 outputs the calculated DCT coefficient after the prediction processing. FIG. 2B is a detail view of the flag calculation part 206 and the local buffer 207. The local buffer 207 includes a flag holding part for storing a reference flag.

Figure 3:
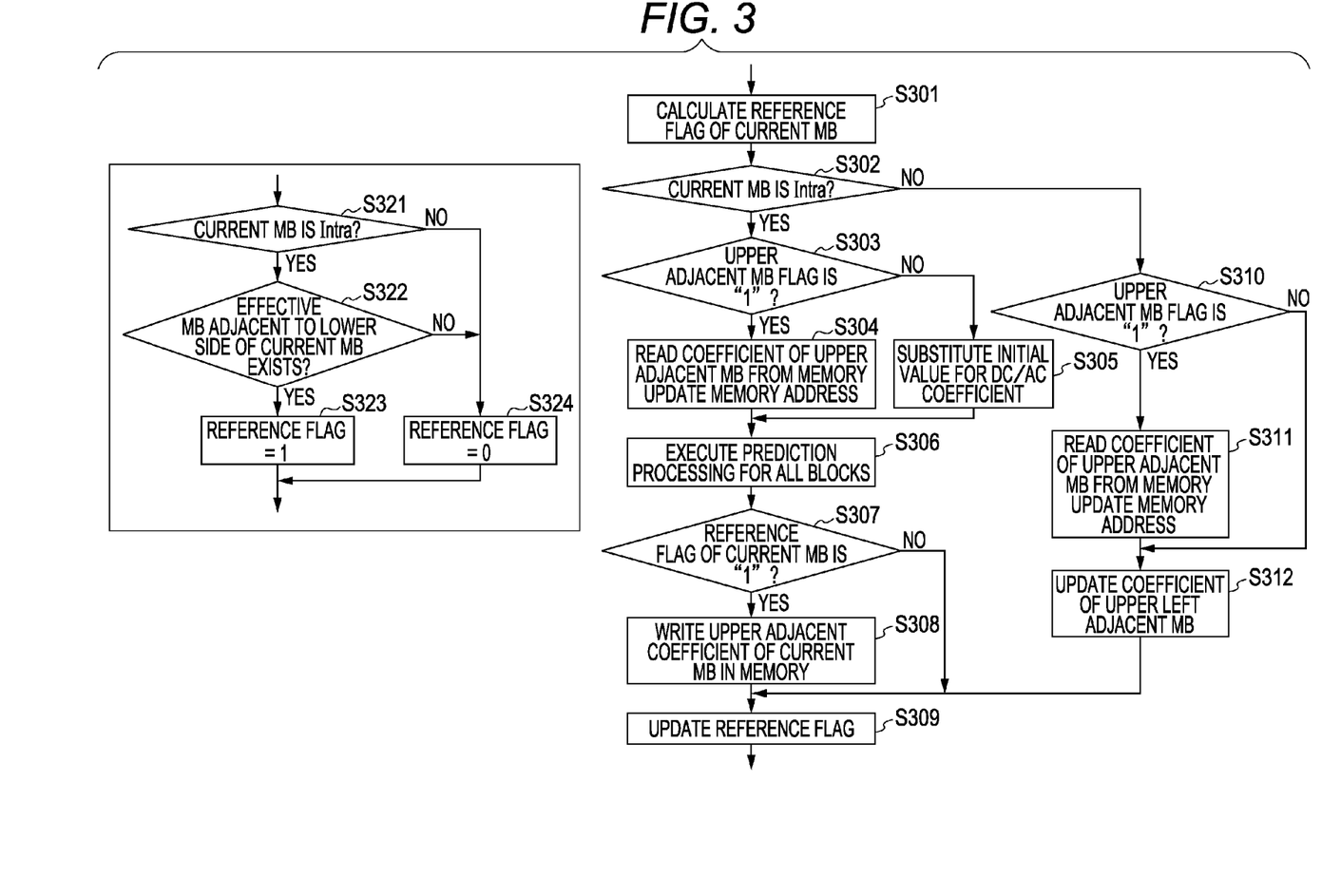
FIG. 3 is a flow chart of a process for 1 MB performed by the AC/DC calculation part, according to an embodiment of the invention.

FIG. 3 is a flow chart of the processing for one macroblock performed by the AC/DC calculation part 103, according to the embodiment of the invention.

In S301, a reference flag of the currently processed macroblock is calculated.

S321 to S324 is the detailed processing procedure of the calculation of the reference flag in S301.

In S321, whether or not the currently processed MB is the intra macroblock is judged. The judgment is performed based on the MB parameter output from the VLC decoding part 102.

When the currently processed macroblock is the intra macroblock, the processing proceeds to S322. When the currently processed macroblock is not the intra macroblock, the processing proceeds to S324.

In S322, whether the macroblock adjacent to the lower side of the currently processed macroblock exists is judged. When the macroblock adjacent to the lower side of the currently processed macroblock exists, the processing proceeds to S323. When the macroblock adjacent to the lower side of the currently processed macroblock does not exist, the processing proceeds to S324. Whether the macroblock adjacent to the lower side of the currently processed macroblock exists is judged based on the MB parameter output from the VLC decoding part 102.

In S323, the reference flag "1" of the currently processed macroblock indicates that the coefficient of the currently processed macroblock is used in the processing of the lower adjacent macroblock.

In S324, the reference flag "0" of the currently processed macroblock indicates that the coefficient of the currently processed macroblock is not used in the processing of the lower adjacent macroblock.

The reference flag of the currently processed macroblock is obtained by the above procedure.

In S302, whether or not the currently processed macroblock is an intra macroblock is judged. When the currently processed macroblock is the intra macroblock, the processing proceeds to S303. When the currently processed macroblock is not the intra macroblock, the processing proceeds to S310. Whether or not the currently processed macroblock is the intra macroblock is judged based on the MB parameter output from the VLC decoding part 102.

In S303, whether the reference flag of the macroblock adjacent to the upper side of the currently processed macroblock on a screen is 1 is judged. When the reference flag is 1, the processing proceeds to S304. When the reference flag is 0, the processing proceeds to S305. The reference flag "0" of the macroblock adjacent to the upper side of the currently processed macroblock indicates that the coefficient of the upper adjacent macroblock is not used in the decoding of the currently processed macroblock.

In S304, the coefficient of the macroblock adjacent to the upper side of the currently processed macroblock on a screen is read from the external memory 209, and determined as the prediction value.

In S305, a specific initial value is chosen as the prediction value.

In S306, the processing part 203 calculates the DC coefficient and the AC coefficient of the block, included in the currently processed macroblock, by using the prediction value chosen in S305.

In S307, whether the reference flag of the currently processed macroblock is 1 or not is judged. When the reference flag is 1, the processing proceeds to S308, and when the reference flag is not 1, the processing proceeds to S309.

In S308, the coefficient of the currently processed macroblock is written in the region in the external memory 209 in which the DCT coefficient of the upper adjacent MB is stored. The coefficient of the currently processed macroblock is the coefficient on the top line of the lower blocks Y2 and Y3 of four blocks representing brightness and the coefficient on the top line of the blocks of the color differences Cb and Cr.

In S309, the reference flag of the currently processed macroblock is written the local buffer 207.

In S310, whether or not the reference flag of the macroblock adjacent to the upper side of the currently processed macroblock on a screen is 1 is judged. When the reference flag is 1, the processing proceeds to S311, and when it is not 1, the processing proceeds to S312.

In S311, the coefficient of the macroblock adjacent to the upper side of the currently processed macroblock is read from the external memory 209.

In S312, the coefficient of the macroblock located on the upper left side of the currently processed macroblock is written in the external memory 209 to be updated.

In the above procedure, S322 may be omitted. In this case, even if the macroblock adjacent to the lower side of the currently processed macroblock does not exist, the access to the external memory 209 is executed.

Figure 4:
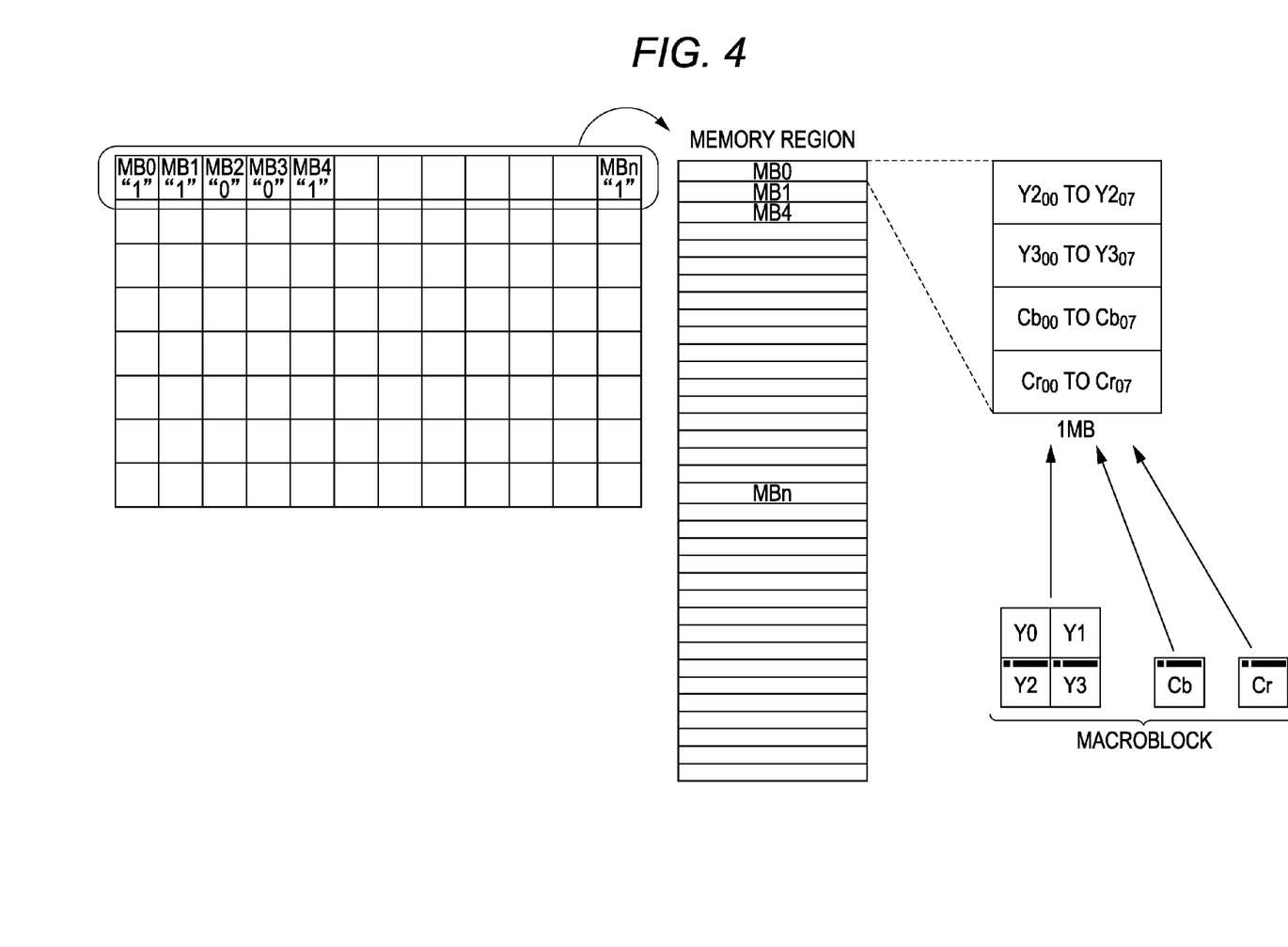
FIG. 4 is a storage example of data in a memory region according to an embodiment of the invention.

When the AC/DC coefficient is calculated by the above method, if the macroblock is the inter macroblock, the coefficient is not written in the external memory 209. Therefore, as shown in FIG. 4, the data written in the external memory 209 is small in amount. For example, since MB0 is the intra macroblock, the coefficient on the top row of the lower blocks Y2 and Y3 of four blocks representing brightness and the coefficient on the top of the blocks of the color differences Cb and Cr are written in the external memory 209. Meanwhile, since MB2 is the inter macroblock, the coefficient of MB2 is not written in the external memory 209.

Figure 5:
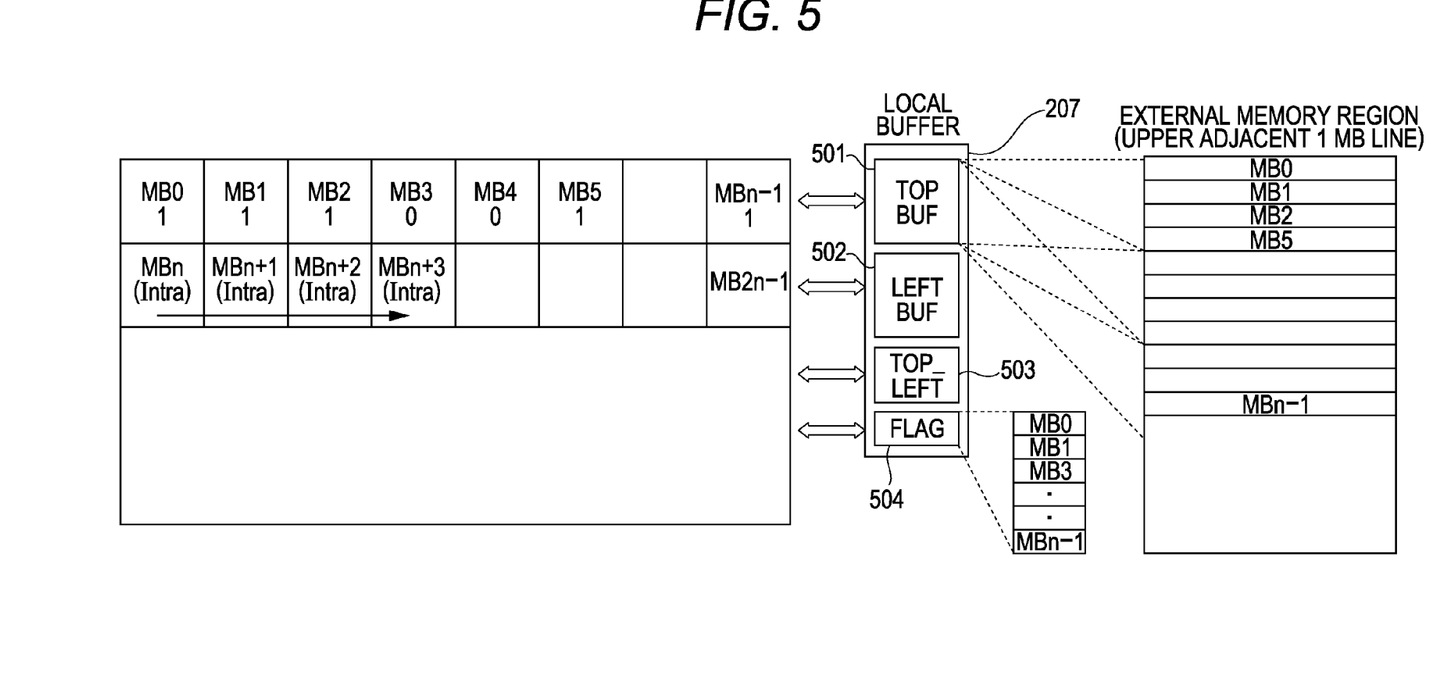
FIG. 5 is a conceptual diagram of memory access in an AC/DC calculation, according to an embodiment of the invention.

FIG. 5 is a conceptual diagram of memory access in the AC/DC calculation, according to the embodiment of the invention.

In the local buffer 207, there are a TOPBUF 501 for storing the coefficient of the upper adjacent MB, a LEFTBUF 502 for storing the coefficient of the left adjacent MB, a TOP_LEFT 503 for storing the coefficient of the upper left adjacent MB, and a FLAG 504 for storing the reference flag.

Whether the access to the external memory 209 is executed is judged based on the reference flags "0" and "1", and the write to the external memory 209 or the read from the external memory 209 is controlled. The coefficients of all the upper adjacent MB in one MB line are not stored in the external memory 209, only the coefficient of the upper adjacent MB in the macroblock with the reference flag "1" is stored in the external memory 209.

According to the embodiment of the invention, when the coefficient of the currently processed macroblock is not used in the decoding of other macroblocks, the prediction value used in the decoding of other macroblocks is not written in a memory, so the frequency of memory access in the decoding in the intra-frame prediction can be reduced.

Further, when the coefficient of the upper adjacent macroblock is not used in the decoding of the currently processed macroblock, the access to the memory is not executed, so the frequency of the memory access can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image decoding apparatus comprising:
a memory;
a detecting part which receives data of a plurality of macroblocks included in an image and detects whether or not a first macroblock included in the plurality of macroblocks has an intra-block; and
a control part which writes a DCT coefficient of the first macroblock into the memory when the detecting part determines that the first macroblock has the intra-block, and does not write the DCT coefficient of the first macroblock into the memory when the detecting part determines that the first macroblock has no intra-block,
wherein a flag indicating that the DCT coefficient of a third macroblock adjacent to the upper side of the first macroblock in the image is used in the decoding of the first macroblock is set when detecting that the third macro block is the intra-block and the first block is provided in the lower side of the third block, and
wherein the control part uses the DCT coefficient of the third macroblock in the decoding of the first macroblock when detecting that the flag is set and the control part does not use the DCT coefficient of the third macroblock in the decoding of the first macroblock when detecting the flag is not set.

2. The image decoding apparatus according to claim 1, wherein the control part does not write the DCT coefficient into the memory when a second macroblock does not exist under the first macroblock in the image.

3. The image decoding apparatus according to claim 1, wherein the control part uses a predetermined value as the DCT coefficient of the first macroblock when detecting the flag is not set.

4. The image decoding apparatus according to claim 3, wherein the control part does not read the DCT coefficient of the third macroblock from the memory when the control part detects that the flag indicating that the DCT coefficient of the third macroblock is not used in the decoding of the first macroblock.

5. An image decoding method comprising:
receiving data of a plurality of macroblocks included in an image, detecting whether or not a first macroblock included in a plurality of macroblocks has an intra-block;
when the first macroblock has the intra-block, writing a DCT coefficient of the first macroblock into a memory, and when the first macroblock has no intra-block, not writing the DCT coefficient of the first macroblock into the memory;
setting a flag indicating that the DCT coefficient of a third macroblock adjacent to the upper side of the first macroblock in the image is used in the decoding of the first macroblock when detecting that the third macro block is the intra-block and the first block is provided in the lower side of the third block;

using the DCT coefficient of the third macroblock in the decoding of the first macroblock when detecting the flag is set; and not-using the DCT coefficient of the third macroblock in the decoding of the first macroblock when detecting the flag is not set.

6. The image decoding method according to claim 5, further comprising: determining whether or not a second macroblock exists under the first macroblock in the image; and when it is determined that the second macroblock does not exist under the first macroblock in the image, not writing the DCT coefficient of the first macroblock into the memory.

7. The image decoding method according to claim 5, further comprising:

using a predetermined value as the DCT coefficient of the first macroblock when detecting the flag is not set.

8. The image decoding method according to claim 7, further comprising:

when the flag indicating that the DCT coefficient of the third macroblock is not used in the decoding of the first macroblock is detected, not reading the DCT coefficient of the third macroblock from the memory.

\* \* \* \* \*